United States Patent [19]
Schoeller

[11] Patent Number: 5,146,961
[45] Date of Patent: Sep. 15, 1992

[54] APPARATUS FOR HINGING A DOOR TO A DOOR JAMB

[76] Inventor: Siegmund Schoeller, 6161 Buxton, West Bloomfield, Mich. 48322

[21] Appl. No.: 614,232

[22] Filed: Nov. 15, 1990

Related U.S. Application Data

[63] Continuation-in-part of Ser. No. 264,837, Oct. 31, 1988, abandoned.

[51] Int. Cl.⁵ .................... B27C 9/04; B27C 3/02
[52] U.S. Cl. .................... 144/3 R; 33/197; 408/103; 408/115 R; 409/130; 409/175; 144/27; 144/93 R; 144/365; 144/367; 144/372
[58] Field of Search .......... 33/197; 408/97, 103, 408/109, 115 R, 12, 26; 409/175, 182, 125, 130; 144/27, 93 R, 104, 365, 367, 371, 372; 269/40, 63, 57

[56] References Cited

U.S. PATENT DOCUMENTS

| | | | |
|---|---|---|---|
| 2,843,167 | 7/1958 | Rushton | 144/27 |
| 2,894,333 | 7/1959 | Zern | 144/27 |
| 3,344,825 | 10/1967 | Kvalheim et al. | 144/27 |
| 3,363,487 | 1/1968 | Gohm, Sr. | 144/27 |
| 4,485,857 | 12/1984 | Norlie et al. | 144/27 |
| 5,063,982 | 11/1991 | Durney | 144/104 |

*Primary Examiner*—W. Donald Bray
*Attorney, Agent, or Firm*—Gifford, Groh, Sprinkle, Patmore & Anderson

[57] ABSTRACT

A portable apparatus for fitting hinges and a door lock set to a door and door jamb assembly prior to installing the door and door jamb assembly in a building. The apparatus includes a main work unit which aligns the door with the door jamb and additionally provides an adjustable hinge template holder which allows for the routing of a recess for a hinge. The apparatus further includes a pair of end vices for attachment to the ends of the door jamb which maintain the door and door jamb in position when moving the main work unit. The end vices also provide a routing guide for the header component.

27 Claims, 4 Drawing Sheets

APPARATUS FOR HINGING A DOOR TO A DOOR JAMB

This is a continuation-in-part of copending application Ser. No. 07/264,837 filed on Oct. 31, 1988, abandoned.

BACKGROUND OF THE INVENTION

I. Field of the Invention

The present invention relates generally to an apparatus for fitting hinges and a door lock set to a door and door jamb assembly prior to installing the door and door jamb assembly in a building. More particularly, the present invention relates to such an apparatus which includes a main work unit for aligning a door and a door jamb and having a hinge template for routing a hinge mortise and drill guides for drilling holes necessary for a door lock set. The present invention also includes end vices which maintain the position of the door and door jamb when moving the main work unit and provide a routing guide for routing a header component.

II. Description of the Relevant Art

Doors are conventionally fitted to a door jamb after the door jamb has been installed in a doorway of a building structure. However, cutting or routing the recesses in the door and the door jamb are processes which are hampered because of the bulkiness of the door and the difficulty of properly aligning a door with the door jamb once installed.

As an alternative, doors and door jambs have been preassembled for fitting into a doorway. Such prehung doors offer a number of advantages over hanging a door after the jamb is installed. Among these advantages is the proper alignment of the door with the door jamb to allow accurate hinge placement.

However, known tools for prehanging doors are extremely bulky and heavy, and therefore their use has largely been limited to the shop or lumber yard setting.

One such apparatus for hanging doors is disclosed in U.S. Pat. No. 3,807,720 issued in 1974 to Converse, et al. The apparatus disclosed therein includes a frame having a series of clamps for clamping the door and the door jambs so as to facilitate the installation of hinges and locking devices. The frame carries both the door and the jambs to allow the worker access to the regions to be worked.

Because of the great mass and size of the frame, the apparatus of Converse is inconvenient and impractical for use in the field.

Accordingly, prior inventions have failed to eliminate the problems commonly associated with known apparatus for hinging a door to a door jamb.

SUMMARY OF THE PRESENT INVENTION

The present invention is a portable apparatus for fitting both hinges and a door lock set to a door and door jamb assembly prior to installing the door and door jamb assembly in a building.

The apparatus comprises a main work unit which aligns the door with the door jamb. Once aligned, the main work unit also allows for the routing of a hinge mortise for a hinge.

The apparatus further includes a pair of end vices for attachment to the ends of the door jamb which maintain the door and door jamb in position when moving the main work unit. The end vices also provide a routing guide for the header component.

The main work unit includes a number of component parts. These include a central plate fittable between the door and the door jamb and an adjustable front clamp interrelated to the central plate by a pair of L-shaped main brackets. When properly adjusted, the central plate and the front clamp firmly hold the door therebetween.

The front clamp plate further includes two pins for resting the plate along the edge and the side of the door. In addition, the front clamp plate is fitted with an interchangeable doorlock drill guide to allow for variations in the doorlock bracket.

A pair of clamps are slidably attached to the central plate for firmly grasping the door jamb. The clamps force the jamb to abut the door abutting regions on the L-shaped main brackets.

Pivotally fitted between the L-shaped main brackets is an adjustable hinge template holder. The templates, preferably composed of a polymerized material such as a plastic, are seatable therein. A pivotable doorlatch drill guide is pivotally fitted between the brackets holding the template holder between the L-shaped brackets.

In use, the main work unit is lockably fastened to one side of the door and to the door jamb, and the region for the hinge is routed out. Once the hinge routing step is completed, the main work unit is moved to the next location, the hinge is emplaced and the hinge screw holes are bored. The process is repeated until all the hinge recesses are completed. Thereafter, the header of the door jamb is routed, and the vices are released. The main work unit is then attached to the other side of the door for drilling out the holes required for the door lockset.

Other advantages and features of the present invention will become more apparent from the following detailed description when read in conjunction with the accompanying drawings.

BRIEF DESCRIPTION OF THE DRAWINGS

The present invention will be more fully understood by reference to the following detailed description of the preferred embodiment of the present invention when read in conjunction with the accompanying drawings, in which like reference characters refer to like parts throughout the views, and in which.

DETAILED DESCRIPTION OF THE PREFERRED EMBODIMENT OF THE PRESENT INVENTION

FIGS. 1-7 show a preferred embodiment of the present invention. While the configuration according to the illustrated embodiment is preferred, it is envisioned that alternate configurations of the present invention may be adopted without deviating from the invention as portrayed. The preferred embodiment is discussed hereafter.

Figure 1:
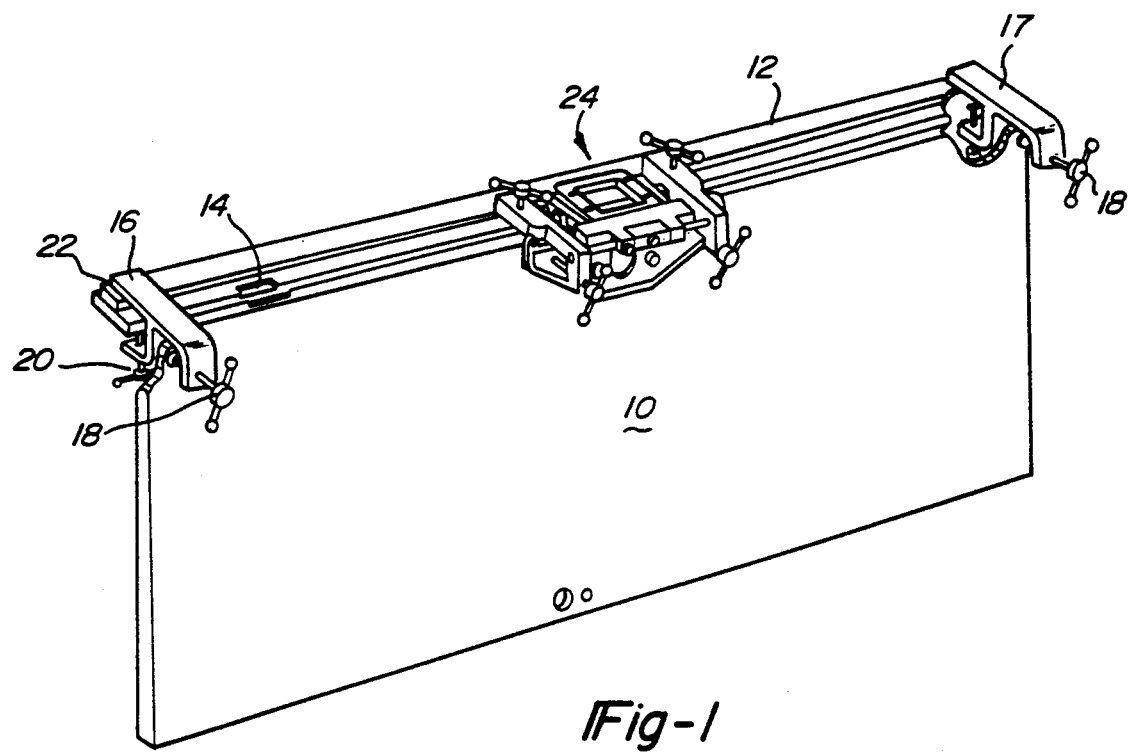
FIG. 1 is a perspective view illustrating the apparatus in place interlocking a door and a door jamb for routing recesses for hinges.

With reference to FIG. 1, there is shown a door and a door jamb 12. The door 10 and the door jamb 12 are preferably composed of wood, although it is envisioned that other compositions may be successfully worked by the present invention.

The door 10 and door jamb 12 are preliminary and temporarily aligned so that the hinge recesses may be routed in proper alignment. By way of example, a routed hinge recess is generally indicated as 14.

To properly align the door 10 with the door jamb 12, a main work unit, generally indicated as 24, is primarily used. A pair of end vices 16, 17 maintain the door 10 and the door jamb 12 in alignment when the main work unit 24 is moved to different locations along the door 10 and its associated door jamb 12. The vices 16, 17 each includes a door locking handle 18 and a door jamb handle 20.

The end vices 16, 17 should be located so that approximately one inch of the door jamb 12 projects beyond the vices 16, 17. This positioning allows the vices 16, 17 to also be used as guides for rabbeting the ends of the jamb 12. By placing a router (not shown) at the end of the jamb 12 and following along a router guide edge 22, the door jamb 12 may be properly rabbeted to allow for the insertion of a door header.

The placement of the vices 16, 17 relative to the door 10 is fixed so that the router setting for routing the hinge recesses is equivalent to that setting required for rabbeting the door jambs.

After the steps of routing and rabbeting are completed, the hinges (not shown) are positioned and locked in place with conventional screw fasteners (not shown) before the vices 16, 17 are removed.

In addition to these articulated functions, the vices 16, 17 also serve as end stops for the hinge routing procedure. Specifically, hinge routing is accomplished using the main work unit 24. The main work unit 24 may be travelled along the door 10 and door jamb 12 until it is stopped by one or the other of the vices 16, 17. At this point, the hinge recess should be routed. Provided the vices 16, 17 were properly and measurably fitted initially, the distance of the end hinges (not shown) once applied should be an equal distance from the ends of the door 10 and the door jamb 12.

The main work unit 24 is the primary element of the present invention. In place as shown, the unit 24 is placed to route the middle of three hinge mortises. Once routed, the unit 24 may be loosened (as discussed hereafter) to facilitate travel to the next desired place for routing a hinge recess.

Figure 2:
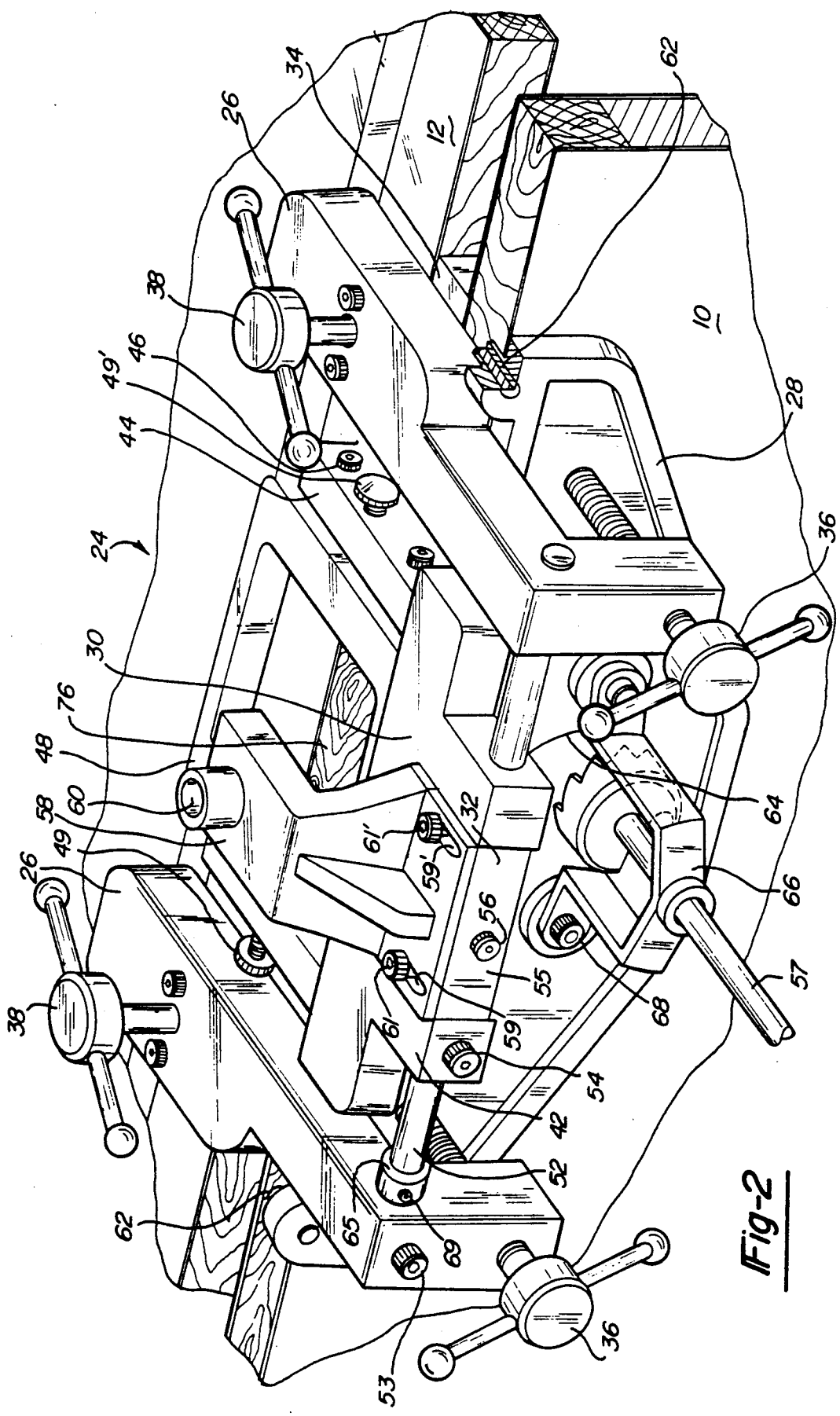
FIG. 2 is a detailed partial perspective view illustrating the main work unit of the present invention in place on a door and door jamb.

With reference to FIG. 2, the main work unit 24 is illustrated in detail and is shown in place aligning the door 10 with the door jamb 12. The unit 24 comprises a few major elements and several minor elements. Visible in the present view are certain of the main elements including a pair of L-shaped main brackets 26, a front plate 28, a pivotable template carriage 30, a pivotable doorlatch drill guide assembly 32, and, partially illustrated, a central plate 34. The central plate 34 is more fully described below in relation to FIG. 7. The pivotable doorlatch drill guide assembly 32 comprises an upper portion 58 having drill guide bushing 60 fitted thereto. The upper portion is slidably fitted to a drill guide base 55. The drill guide assembly 32 is more fully discussed below with respect to FIG. 7.

Each of the pair of L-shaped main brackets 26 includes a door securing screw 36 and a door jamb abutment screw 38. By turning down the door securing screw 36, the front plate 28 is pressed against the door 10 which in turn is pressed against the central plate 34, thereby locking the door 10 between the front plate 28 and the central plate 34. By turning down the door jamb abutment screw 38, a door jamb clamp 40 (see FIGS. 4, 6 and 7) is drawn up to press upon the underside of the door jamb 12, thereby bringing the jamb 12 up to firmly press against and abut the underside of the L-shaped main bracket 26. To release the door 10 and the door jamb 12, the door securing screw 36 and the door jamb abutment screw 38 are turned up respectively.

The pivotable template carriage 30 is an aspect of the present invention which offers particular flexibility to the worker. The carriage 30 comprises a number of interrelated elements. These elements include a template fork 42, a pair of template adjusting rods 50 (see FIG. 7), a pair of template braces 44 slidably disposed on the template adjusting rods 50, template slide locking screws 46, and an interchangeable template 48. The template 48 is preferably composed of a polymerizable material and is interchangeable to allow for variations in hinge size and shape.

To maximize the utility of the present invention, the slidably adjustable template rests 44 may also be used to support a template (not shown) which allows the user to route the striker door plate and the door latch plate according to the manufacturer's design. In this manner the rests 44 accomodate both functions of the main body.

The template 48 is held to the template braces 44 by a pair of spring loaded knobs 49, 49'. The knobs 49, 49' include pins 51, 51' (see FIG. 7) which are insertable into the sides of the template 48 (this may be better understood by relerence to FIG. 7). To remove the template 48, the knobs 49, 49' are simply withdrawn and the template 48 is removed and, if desired, replaced.

Because the pins 51, 51' of the knobs 49, 49' are in axial alignment, the template 48 is allowed to pivot to follow the contour of the edge of the door 10. This pivoting action accomodates the edge of the door which is usually undercut at something other than a ninety degree angle, usually by two or three degrees, with respect to the plane of the side of the door.

To maximize adjustment capabilities, the template braces 44 may be slidably adjusted along a pair of template adjusting rods 50 (illustrated in FIG. 7) until the proper placement is achieved. Thereafter, the braces 44 may be locked to the rods 50 by means of turning down and hence locking the template slide locking screws 46. Of course, other means of lockably adjusting the template 48 with respect to the template fork 42 may be applied without exceeding the scope of the invention.

The template fork 42 is pivotably mounted between the L-shaped main brackets 26 by a main pivotable rod 52. The template fork 42 is locked to the rod 52 by a set screw 54. The rod 52 is locked to one of the L-shaped brackets 26 by a set screw 53. (See also FIG. 7.)

Still referring to FIG. 2, the front plate 28 is fitted with a pair of door rest pins 62 which, when the plate 28 is in position, rest against the edge of the door 10. The front plate 28 has additionally defined therein a handle hole drill aperture 64 and has mounted thereto an interchangable doorlock drill guide 66, both of which will be described further below. An interchangable handle hole drill 57 is shown in place in the guide 66. (See also FIG. 7.)

To truly maximize the utility of the present invention, the main work unit 24 doubles as a door lockset preparer by including the necessary guides to drill out door cylinder and door handle apertures.

The pivotable doorlatch drill guide assembly 32 is also pivotably mounted on the main pivotable rod 52. The drill guide assembly 32 is lockably fixable to the rod 52 by lockable adjustment of a drill guide set screw 56.

The guide plate portion 58 is adjustably fitted to the drill guide base 55. Adjustment is provided through a pair of elongated slots 59, 59'. A pair of set screws 61, 61' are turned down to lock the guide plate portion 58 in place against the drill guide base 55. This allows adjustment between a 2¼ inch set back and a 1⅜ inch set back from the edge of the door, these two set back dimensions being conventionally provided in known doorlock sets.

Still referring to FIG. 2, to prepare a door lockset, the main work unit 24 is positioned at the desired place along the edge of a door 10. To clamp the unit 24 to the door, the worker turns down the door securing screws 36 to interlock the door 10 between the central plate 34 and the front plate 28. Thereafter, the proper drill guide 66 is selected and locked to the front plate 28 by a pair of drill guide screws 68. The drill guide 66 conventionally has an aperture to accomodate a drill having a ½ inch shank Furthermore, one door lockset may have a different set back compared with another, as illustrated in FIGS. 3 and 3A.

Figure 3:
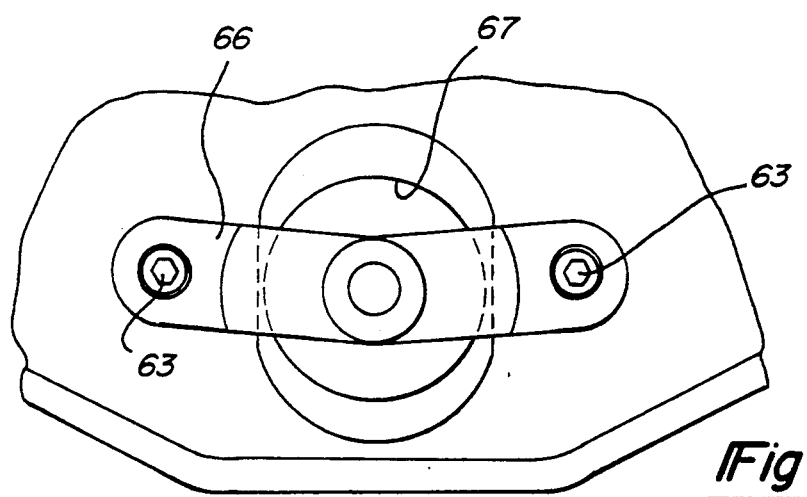
FIG. 3 is a detailed partial view illustrating one drill guide of the interchangeable door handle guide assembly according to the present invention.
Figure 3A:
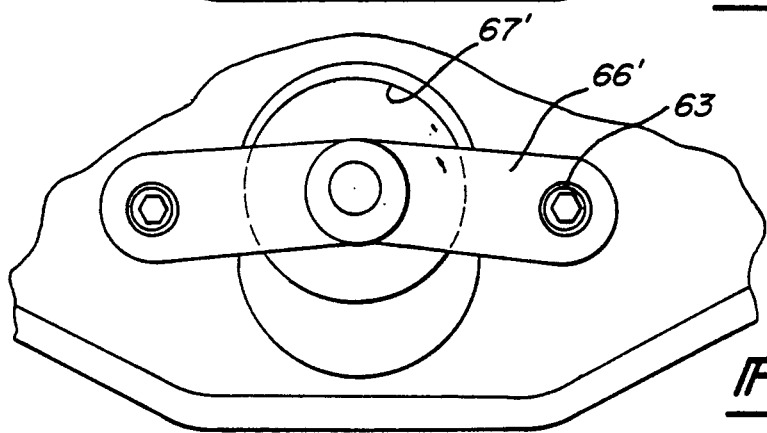
FIG. 3A is a detailed partial view illustrating another drill guide of the interchangeable door handle guide assembly.
Figure 7:
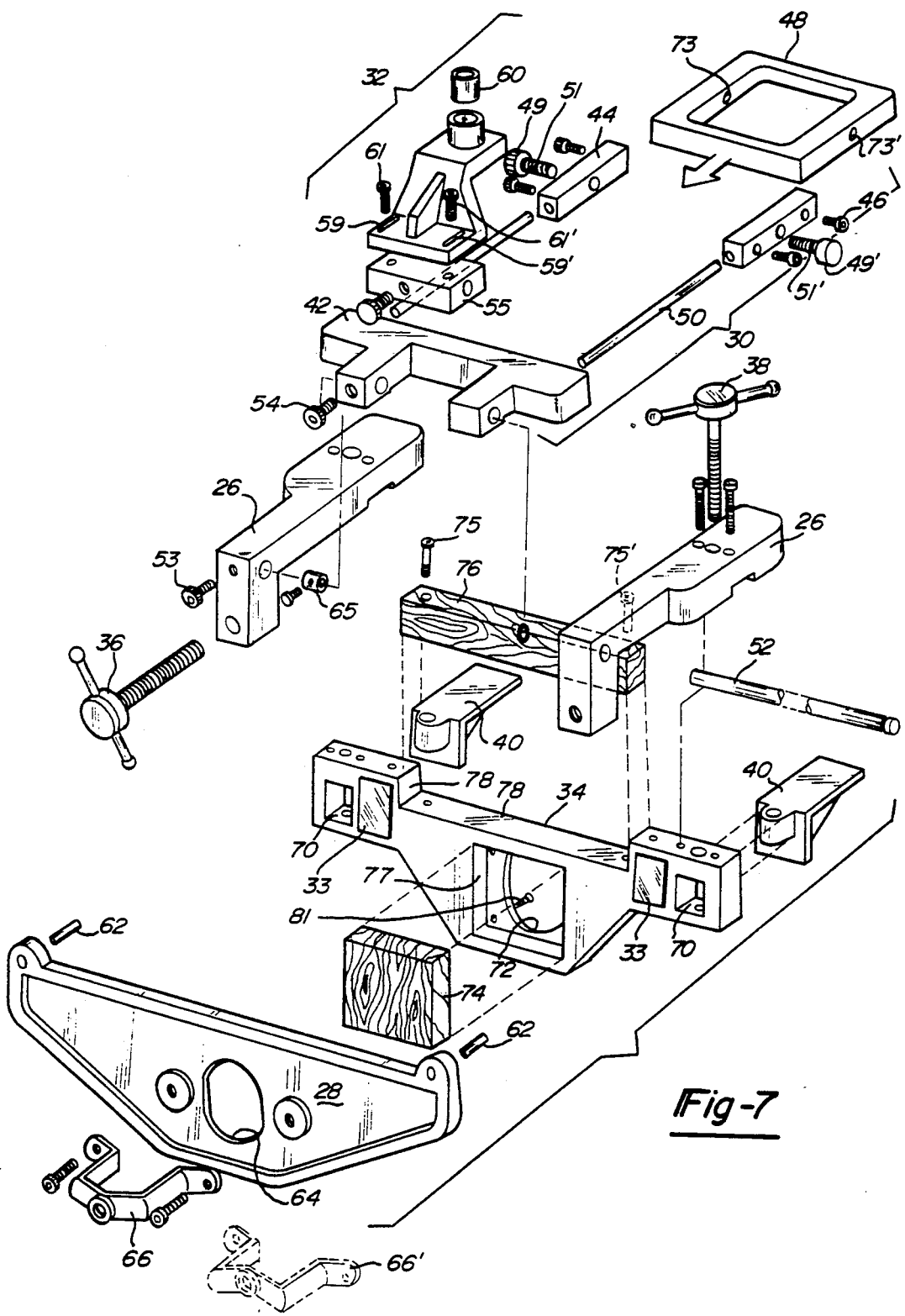
FIG. 7 is an exploded perspective view illustrating the components of the main work unit.

Accordingly, and with reference to FIGS. 3 and 3A, to accomodate the positioning of the door handle further from or closer to the edge of the door as may be required by the variously designed and constructed door lock sets presently available, a first guide 66 is shown in FIG. 3 relative to a door handle hole 67. In FIG. 3A, a second guide 66' is shown relative to a door handle hole 67'. One or the other of guides 66, 66' may be selected as desired to accomodate a preferred door lockset, thereby accomodating locksets having different set back distances from the edge of the door for the selected lockset handle assembly. (The guides 66, 66' are also shown in FIG. 7, the latter guide being visible in broken lines.) The guides 66, 66' are removably attachable to the front plate 28 by attachment screws 63.

Figure 4:
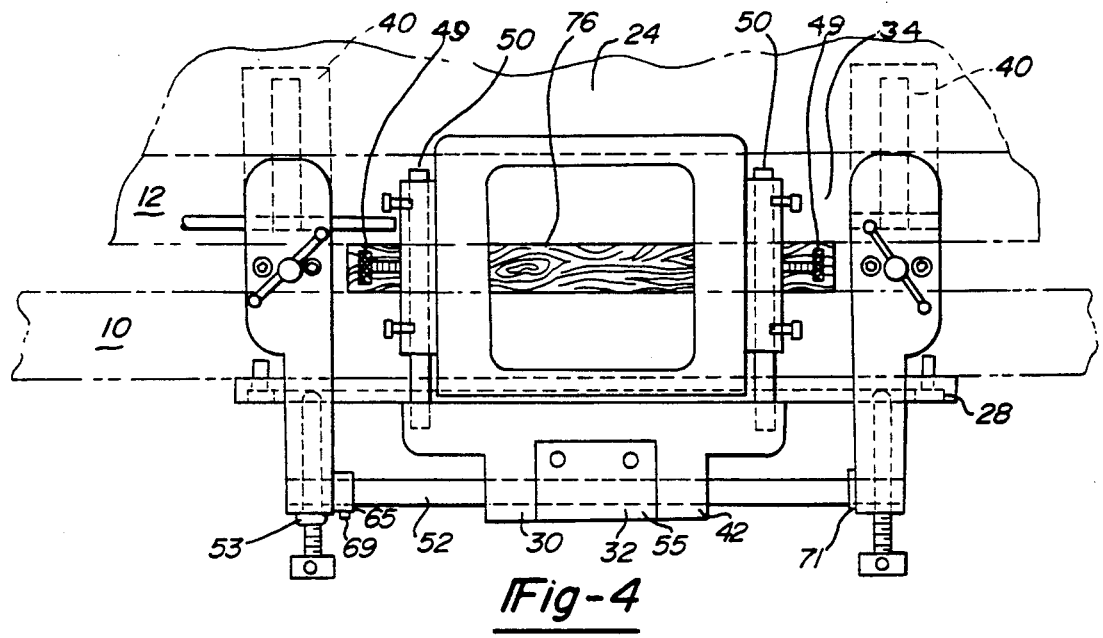
FIG. 4 is a partial top plan view illustrating the components, partially shown by broken lines, of the main work unit.

With reference to FIG. 4, a top view of the main work unit 24 is illustrated, detailing the major elements. The door jamb clamps 40 are illustrated in broken lines as are the pair of template adjusting rods 50. In addition, the relationships of the central plate 34 to the door 10, the door jamb 12, and the front plate 28 are also illustrated.

To allow an incremental side-to-side movement of both the template fork 42 (of the pivotable template carriage 30) and the drill guide base 55 (of the pivotable doorlatch drill guide assembly 32) as a pair (the drill guide base 55 being disposed between the two rod-attaching projections of the template fork 42), a collar 65 having a set screw 69 is provided on the rod 52. Also provided on the rod 52 is a split ring 71. The collar 65 may be moved axially along the rod 52, while the ring 71 is provided in a groove defined on the rod 52. This "fine tuning" characteristic allows the user to control the accurate placement of the carriage 30 and the drill guide assembly 32 before beginning the necessary routing or drilling operation by selective positioning of the collar 65.

Figure 5:
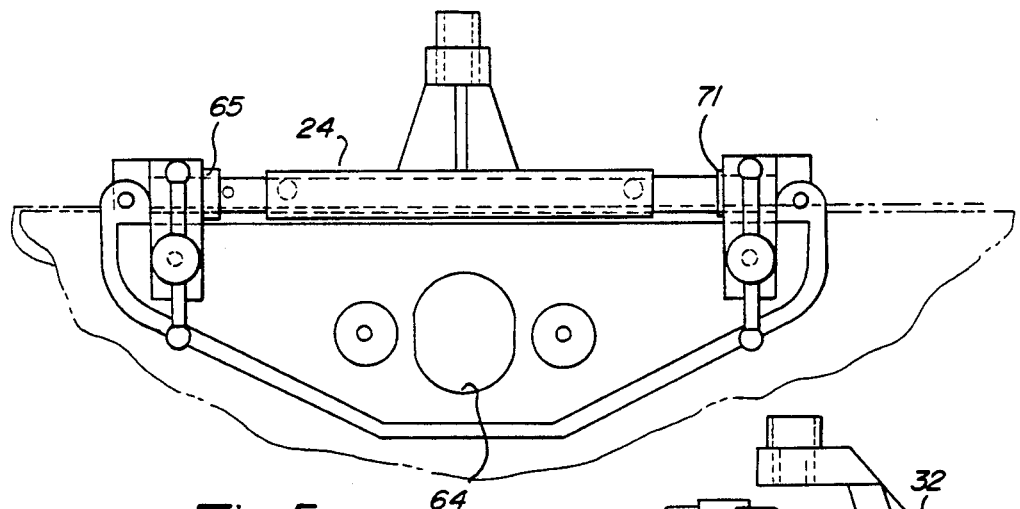
FIG. 5 is a partial side view illustrating the components, partially shown by broken lines, of the main work unit.

Referring to FIG. 5, a front view of the main work unit 24 is illustrated. To display the oblong shape of the handle drill aperture 64, the doorlock drill guide 66 is not shown.

Figure 6:
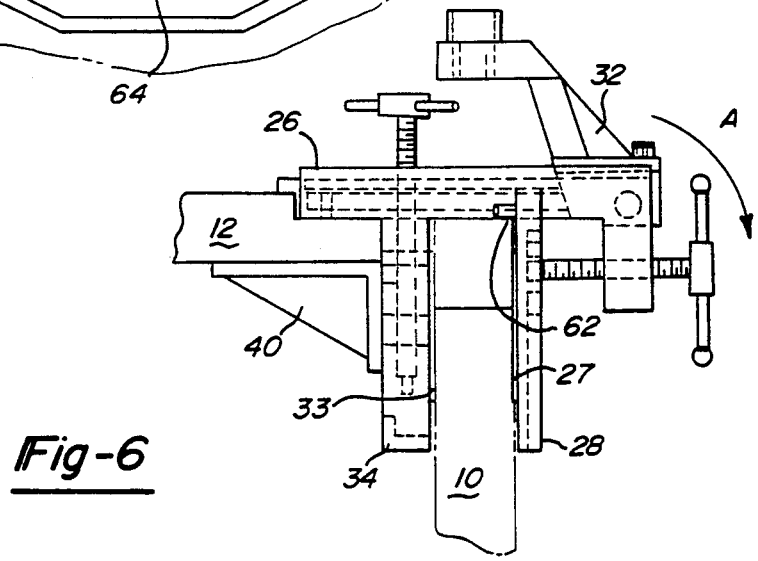
FIG. 6 is a partial end view illustrating the components, partially shown by broken lines, of the main work unit.

With reference to FIG. 6, an end view of the main work unit 24 is illustrated. By this illustration, the operation of the door jamb clamp 40 may be more fully understood. As illustrated, the door jamb 12 is lockingly fitted between the clamp 40 and the underside of the L-shaped bracket 26.

The illustration of FIG. 6 also assists in clarifying how the door rest pin 62 rests upon the edge of the door 10. Also illustrated is how the pivotable door doorlatch guide 32 may be pivoted from its in-use position (as illustrated) to its out of the way position (not illustrated) by following the direction of movement generally indicated by arrow "A". The drill guide 32 should be pivotally moved away from its in-use position to make way for the router when the body 24 is being used to route a hinge recess or the latch recess for the latch plate.

FIG. 6 also illustrates the provision of opposingly provided phenolic pads to protect the sides of the door 10 while held in the main work unit 24. A pad 33 is provided on the inner wall of the central plate 34, and a pad 27 is provided on the inner wall of the front plate 28. Optionally, other protective material such as cork may be used in lieu of the phenolic material.

Referring to FIG. 7, an exploded view of all of the component parts of the main work unit 24 is illustrated. In addition thereto, certain ones of the above-discussed components may be seen in greater detail, particularly the central plate 34.

With reference still to FIG. 7, the central plate 34 has defined therein a pair of clamp receiving apertures 70. These apertures 70 allow for the free up-and-down movement of the clamps 40. The clamps 40 are moved up relative to the central plate 34 when the door jamb abutment screws 38 are turned down, thereby drawing the door jamb 12 up toward the underside of the L-shaped main bracket 26.

The central plate 34 also has defined therein a back side handle hole saw aperture 72 which is aligned with the handle saw aperture 64 defined in the front plate 28. The apertures 64, 72, when aligned, permit the through-passage of the hole drill 57. (See FIG. 2.)

As illustrated herein, the pivoting action of the template 48 (discussed above more fully with respect to FIG. 2) is provided by removable insertion of the pins 51, 51' into a pair of receiving holes 73, 73' which respectively receive the pins 51, 51'.

To prevent the shredding or splintering of the back side of a door (not shown) when being drilled while clamped between the front plate 28 and the central plate 34, a drill back-up block 74 is removably inserted into a block-shaped drill back-up block recessed region 77 defined in the central plate 34. (The block is held in place within the recessed region 77 by a number of screws 81.) Shredding and splintering are prevented by the cutting tool cutting into a second wood object, the block 74, by abutting the backside of the door (not shown) whereby the last-cut outer surface (or veneer) of the door is fully supported and held in place as the cutting tool exits the wood of the door. The provision of the block 74 provides the present invention with a feature unknown in present or table units for fitting hinges and for drilling door locks.

To also prevent shredding and splintering where the cutting tool exits the door after cutting as described above with respect to the block 74 when the recess for a hinge is being routed, a wooden spacer 76 is inserted into a channel 78 defined in the central plate 34. As may be clearly understood by reference to FIG. 4, the wooden spacer is disposed (as is the central plate 34) between the door 10 and the door jamb 12 when the main work unit 24 is in place. The spacer 76 is held in place in the channel 78 by a pair of screws 75, 75'. (Shown in FIG. 7.)

With the wooden spacer 76 in place between the door 10 and the door jamb 12, the step of routing can be effected without shredding or splintering, as the wooden spacer would be routed along with the door 10 and the door jamb 12. For clarity, the spacer 76 is shown in place in FIG. 2. The block 74 and spacer 76 are preferably formed of wood so that they may readily be replaced on the job site. Furthermore, it should be observed that an additional feature of the present design is that the main working body 24 can also be used for fitting a new door onto an existing frame. The present invention therefore aids in matching the hinge area to be routed on the new door to meet the existing hinge position on the existing door frame.

Having set forth the present invention and what is considered to be the best embodiment thereof, it will be understood that changes may be made from the specific embodiment set forth without departing from the spirit of the invention or exceeding the scope thereof as defined in the following claims.

I claim:

1. A tool set for preliminarily fitting a door to a door jamb prior to fitting the door and door jamb assembly into a doorway and for drilling holes in a door for a doorlock set, said door and said door jamb assembly having a first end and a second end, said tool set comprising:
   a portable main work unit for selectively releasably locking said door to said door jamb, said work unit including a hinge cutting template pivotably attached to said work unit, at least one doorlatch drill guide pivotally attached to said work unit and at least one doorlock drill guide fixedly attached to said work unit;
   said work unit having means for releasably and selectively interlocking said door and said door jamb; and
   a pair of portable end clamps removably attachable to said first end and said second end of said door and door jamb assembly for aligning said door with said door jamb.

2. A tool set for preliminarily fitting a door having a front side and a back side to a door jamb having a bottom side and a top side prior to fitting the door and door jamb assembly into a doorway and for drilling holes in a door for a doorlock set, said door and door jamb assembly having a first end and a second end, said tool set comprising:
   a support-free portable main work unit for selectively releasably locking said door to said door jamb;
   a template portion mounted on said main work unit; and
   an end clamp provided independent of said main work unit removably attachable to said first or second ends of said door and door jamb assembly for aligning said door with said door jamb.

3. The tool set for preliminarily fitting a door to a door jamb according to claim 2, further comprising a doorlatch drill guide mounted to said main work unit.

4. A tool set for preliminarily fitting a door having a front side and a back side to a door jamb having a bottom side and a top side prior to fitting the door and door jamb assembly into a doorway and for drilling holes in a door for a doorlock set, said door and door jamb assembly having a first end and a second end, said tool set comprising:
   a portable main work unit for selectively releasably locking said door to said door jamb;
   a hinge template portion mounted on said main work unit; and
   a doorlatch drill guide mounted to said main work unit;
   said drill guide being pivotably mounted to said main work unit.

5. A tool set for preliminarily fitting a door having a front side and a back side to a door jamb having a bottom side and a top side prior to fitting the door and door jamb assembly into a doorway and for drilling holes in a door for a doorlock set, said door and door jamb assembly having a first end and a second end, said tool set comprising:
   a portable main work unit for selectively releasably locking said door to said door jamb;
   a hinge template portion mounted on said main work unit; and
   a doorlatch drill guide mounted to said main work unit;
   said drill guide comprising an upper portion and a lower portion, said upper portion being movably fitted to said lower portion.

6. A tool set for preliminarily fitting a door having a front side and a back side to a door jamb having a bottom side and a top side prior to fitting the door and door jamb assembly into a doorway and for drilling holes in a door for a doorlock set, said door and door jamb assembly having a first end and a second end, said tool set comprising:
   a portable main work unit for selectively releasably locking said door to said door jamb; and
   a hinge template portion mounted on said main work unit;
   said hinge template portion being pivotably mounted to said main work unit.

7. The tool set for preliminarily fitting a door to a door jamb according to claim 6 wherein said hinge template portion comprises a hinge template body and at least one hinge template;
   said at least one hinge template being removably and interchangeable to said template body; and 'means for releasably attaching said at least one hinge template to said hinge template body.

8. The tool set for preliminarily fitting a door to a door jamb according to claim 7 wherein said at least one hinge template is pivotably mounted on said hinge template body.

9. The tool set for preliminarily fitting a door to a door jamb according to claim 7 wherein said hinge template body is slidably adjustable relative to said main unit.

10. A tool set for preliminarily fitting a door having a front side and a back side to a door jamb having a bottom side and a top side prior to fitting the door and door jamb assembly into a doorway and for drilling holes in a door for a doorlock set, said door and door jamb assembly having a first end and a second end, said tool set comprising:
a portable main work unit for selectively releasably locking said door to said door jamb;
a hinge template portion mounted on said main work unit; and
said main work unit comprising:
a central plate;
a front clamp plate, said central plate and said front clamp plate being interattached in a spaced apart relationship whereby said door is partially positioned therebetween.

11. The tool set for preliminarily fitting a door to a door jamb according to claim 10 further comprising at least one doorlock set drill guide;
said at least one doorlock set drill guide being removably and interchangeably reattachable to said front clamp plate; and
means for releasably attaching said at least one doorlock set drill guide to said front clamp plate.

12. The tool set for preliminarily fitting a door to a door jamb according to claim 11 wherein said front clamp plate includes a drilling aperture defined therein.

13. The tool set for preliminarily fitting a door to a door jamb according to claim 12 wherein said central plate includes a drilling aperture defined therein.

14. The tool set for preliminarily fitting a door to a door jamb according to claim 13 wherein said central plate includes a block-shaped recess defined therein for removably receiving a drilling aperture backing element.

15. The tool set for preliminarily fitting a door to a door jamb according to claim 11 wherein:
said central plate includes an inner side and an outer side, said inner side of said central plate abutting said door when said main work unit is in place for working said door;
said front clamp plate includes an inner side and an outer side, said inner side of said front clamp plate abutting said door when said main work unit is in place for working said door;
said inner sides of said central plate and said front clamp plate having positioned thereon one or more portions of protective material for protecting said door.

16. The tool set for preliminarily fitting a door to a door jamb according to claim 10 wherein said main work unit further includes a pair of adjustable door jamb clamp brackets and means for adjusting said door jamb clamp brackets, said means for adjusting interconnecting said clamp brackets and said central plate whereby said means for adjusting may be selectively changed to reversibly adjust said clamps from an unclamped position to a clamped position where said clamp brackets abut said bottom side of said door jamb.

17. The tool set for preliminarily fitting a door to a door jamb according to claim 16 wherein said central plate has defined therein a pair of apertures for slidably receiving said pair of door jamb clamp brackets.

18. The tool set for preliminarily fitting a door to a door jamb according to claim 10 wherein said main work unit further includes a pair of L-shaped main brackets lockably attachable to said central plate.

19. The tool set for preliminarily fitting a door to a door jamb according to claim 18 wherein each of said L-shaped main brackets includes:
a door jamb abutment portion for abutting said top side of said door jamb: and
a front clamp plate adjustment means portion.

20. A tool set for preliminarily fitting a door having a front side and a back side to a door jamb having a bottom side and a top side prior to fitting the door and door jamb assembly into a doorway and for drilling holes in a door for a doorlock set, said door and door jamb assembly having a first end and a second end, said tool set comprising:
a portable main work unit for selectively releasably locking said door to said door jamb;
a hinge template portion mounted on aid main work unit;
a pair of portable end clamps removably attachable to said first end and said second end of said door and door jamb assembly for aligning said door with said door jamb.

21. The tool set for preliminarily fitting a door to a door jamb according to claim 20 wherein said pair of end clamps includes planing and rabbeting guide means for rabbeting said door jamb.

22. The tool set for preliminarily fitting a door to a door jamb according to claim 18 wherein:
a rod is provided to interconnect said pair of L-shaped main brackets; and
said hinge template portion and said doorlatch drill guide are fitted in said rod.

23. The tool set for preliminarily fitting a door to a door jamb according to claim 22 wherein said rod may be incrementally adjusted relative said L-shaped main brackets.

24. The tool set for preliminarily fitting a door to a door jamb according to claim 23 wherein said rod includes a lockable collar positioned thereon.

25. A tool set for fitting a door having a front side and a back side to a door jamb having a top side and a bottom side prior to fitting the door and door jamb assembly into a doorway and for drilling holes in a door for a doorlock set, said door and door jamb assembly having a first end and a second end, said apparatus including a main body unit, said main body unit comprising:
a central plate;
a front clamp plate, said central plate and said front clamp plate being interattached in a spaced apart relationship whereby said door is partially positionable therebetween;
means for adjustably interconnecting said central plate to said front clamp plate, thereby clamping said door therebetween;
at least one adjustable door jamb clamp bracket movably abutted against said central plate;
means for adjustably interconnecting said door jamb clamp bracket to said means for adjustably interconnecting said central plate to said front clamp plate; and
a template assembly pivotally mounted to said means for adjustably interconnecting said central plate to said front clamp plate.

26. The tool set for fitting a door according to claim 25 further including a doorlatch drill guide assembly pivotally mounted to said means for adjustably inter connecting said central plate to said front clamp plate.

27. The tool set for fitting a door according to claim 26 wherein said front clamp plate is provided with a drill guide.

* * * * *